United States Patent Office 2,728,073
Patented Dec. 20, 1955

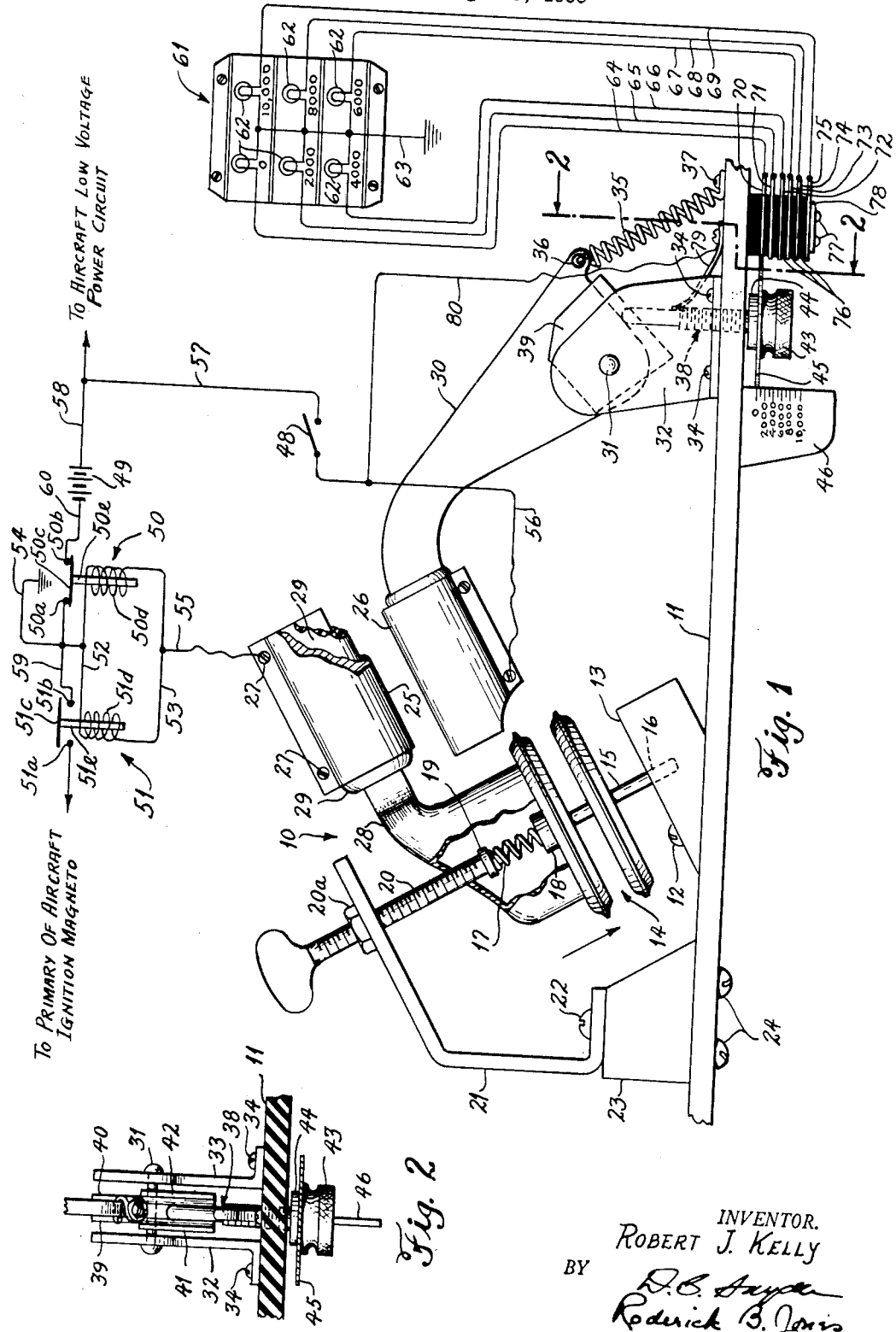

2,728,073
PRESSURE-OPERATED EMERGENCY SWITCH

Robert J. Kelly, Berkley, Mich.

Application August 21, 1953, Serial No. 375,838

4 Claims. (Cl. 340—282)

(Granted under Title 35, U. S. Code (1952), sec. 266)

The invention described herein may be manufactured and used by or for the Government of the United States of America for governmental purposes without the payment of any royalties thereon or therefor.

This invention relates to pressure-operated electrical switches, and is directed particularly to a barometric pressure-operated device for deenergizing aircraft electrical circuits at a predetermined critical altitude. For example, selected circuits can be opened or grounded just before a forced landing in order to minimize the possibility of fire.

This application is a continuation-in-part of my co-pending application Serial No. 256,809, filed November 16, 1951, for improvements in Pressure Operated Emergency Switch, now abandoned.

It is common knowledge that one of the great hazards of aircraft crash landings is the possibility of ignition of spilled gasoline by damaged electrical wiring. The battery power supply can either become short-circuited permanently and heat to the kindling temperature of the gasoline vapor, or it can short temporarily, creating a spark hot enough to cause ignition. Also, the high-tension engine-ignition voltage wiring energized by the magneto can become damaged, and if the engine is still functioning at the time of the crash, as often happens, high-tension sparks to metallic parts of the aircraft could start a fire.

Accordingly, it is one object of this invention to provide a switching device for automatically deenergizing the electrical circuits of a disabled or abandoned aircraft at a predetermined time before the landing of the aircraft.

Another object is to provide a device of the character described that can be preset to become operative at a predetermined elevation above sea level.

A further object is to provide a pressure-operated switching device incorporating a signal panel for indicating visually the selected elevation at which the device will operate.

Other objects and many of the attendant advantages of this invention will be readily appreciated as the same becomes better understood by reference to the following detailed description when considered in connection with the accompanying drawings wherein:

Fig. 1 is a side elevational view of the pressure switch together with its associated wiring and signal panel, showing a preferred embodiment of the invention; and Fig. 2 is a partial, vertical cross-section of Fig. 1 taken along the line 202 thereof.

Similar numerals refer to similar parts throughout the several views.

The pressure-operated switch unit 10 comprises a base plate or panel 11, of electrical-insulation material, against which is secured, as by a pair of screws 12 (only one shown), a wedge-shaped aneroid supporting block 13. The lower end of an aneroid 14 is fixed in inclined relationship with respect to the panel 11 by having its cylindrical leg 15 seated and held frictionally within a cylindrical opening or bore 16 in the supporting block 13.

The upper end of the aneroid 14 is supported resiliently by a coil spring 17, one end of which abuts a central recessed post 18 thereof, and the other end of which is supported on a shouldered pin 19 forming the end of an adjustment screw 20 held in coaxial alignment with said spring and screw by means of an angular bracket 21. The angular bracket 21 is fixed, as by a machine screw 22, to a block 23, which block is secured to the panel 11 as by machine screws 24.

The adjustment screw 20 and its locking nut 20a are provided to allow preliminary setting of the aneroid at sea level so that the upper end thereof, which determines the position of the upper contact 25, is in the proper position with respect to the adjustable lower contact 26, hereinbelow described.

As the aneroid is carried aloft in an aircraft, reduced pressure will, of course, cause the aneroid to expand, so that its upper end will move outwardly, in the direction opposite that indicated by the arrow.

The upper contact 25 comprises an oval metallic sleeve clamped, as by screws 27, about the outer end of an L-shaped bracket 28. The other end of bracket 28 is fixed to the top of the aneroid 14 so as to be movable therewith. The contact 25 is insulated electrically from bracket 28 by an intermediate bushing or sleeve 29, preferably of rubber. The lower contact 26, similarly, is clamped to and insulated from a supporting arm 30. The lower end of the supporting arm 30 is journalled swingably on a pin 31 secured between a spaced pair of upstanding brackets 32, 33 fixed to the panel 11 as by screws 34.

A coil tension spring 35 is connected at one end in an apertured ear 36 extending from the outer end of the supporting arm 30, and at its other end to the panel 11 as by a screw 37, thereby serving to urge the supporting arm 30, together with its contact 26, in the clockwise or upward direction.

Calibrated means for adjusting the position of the supporting arm 30, and hence the position of the lower contact 26 with respect to upper contact 25, is provided. A half-threaded adjustment screw 38 extends perpendicularly through the panel 11. The inner end of adjustment screw 30 is in abutting alignment with the end edge of the supporting arm 30, said arm being constrained thereagainst by action of the tension spring 35.

A pair of plates 39, 40 welded or otherwise fixed against opposite sides of the supporting arm 30, have outwardly flared-end portions 41, 42, respectively, extending beyond the end edge of said supporting arm to provide a track or guide for the inner end of adjustment screw 38.

The underside of knurled head 43 of the adjustment screw 38 has fixed thereagainst, as by a flat retaining nut 44, a centrally apertured electrically conductive disk 45. A vertical bracket 46 mounted against the underside of panel 11 has a vertical edge in close proximity to the edge of the disk 45, said vertical edge having marked thereon a scale of elevation indicia whereby the operator can preset the adjustment screw 38 to the position corresponding with any selected elevation at which the device will become operative. Thus, if the adjustment screw were set for operation at 0 elevation, or sea level, the action of the aneroid 14, upon being brought down to sea level, would move the upper contact 25 into electrical contact with the lower contact 26. If the adjustment screw 38 were set for operaiton at 2000 feet, contact 26 would of course be at a higher position, so as to be contacted by contact 25 at a barometric pressure corresponding to an elevation of 2000 feet.

The upper and lower contacts 25 and 26 control a circuit comprising the on-off switch 48, the aircraft low voltage supply battery 49, a solenoid relay 50 for deenergization of the low voltage supply wiring, and a solenoid relay 51 for shorting the aircraft magneto to ground.

The relay 50 is provided with a pair of switch contacts 50a and 50b, interconnected normally by the shorting arm 50c but adapted to become open-circuited and remain open-circuited when the energization coil 50d of said relay is energized and withdraws its plunger 50e.

The relay 51 is provided with a pair of switch contacts 51a and 51b, open-circuited normally but adapted to become short-ciruited when the energization coil 51d of said relay is energized and withdraws its plunger 51e and associated shorting arm 51c.

The relay-energization coils 50d and 51d are connected in parallel by wires 52 and 53, said parallel circuit being connected in series with the aircraft ground and the upper terminal 25 by wires 54 and 55 respectively.

The lower contact 26 is connected by a wire 56 to one terminal of the on-off switch 48, the other terminal of which is connected by wires 57 and 58 to the positive terminal of the aircraft battery 49. The relay contacts 50a and 51b are interconnected by a wire 59, and grounded by connection with the grounded wire 54. The relay switch contact 50b is connected by a wire 60 to the negative terminal of the aircraft battery 49.

The above-described circuit operates as follows: Upon descending from a higher elevation to the elevation at which the pressure-operated switch is set to operate, the contacts 25 and 26 will touch each other, as hereinabove detailed, completing an energizing circuit to the relays 50 and 51. Said circuit can be traced from ground, through wires 54 and 59, through normally close-circuited contacts 50a and 50b of relay 50, through wire 60 to the negative terminal of the aircraft power supply battery 49, thence, from the positive terminal thereof through wires 58, 57, now closed on-off switch 48, wire 56, through now contacting lower and upper contacts 26 and 25, thence, from contact 25, through wires 55 and 53 to one terminal each of the energization coils 50d and 51d of the relays 50 and 51 respectively, thence, from the remaining terminals of said relays, through wires 52 and 54 back to aircraft ground.

The relay 51 is of a type that is faster acting than the relay 50, so that upon energization it will operate to short the magneto primary of the aircraft to ground before the relay 50 operates to open-circuit the aircraft battery ground circuit.

The magneto grounding circuit, effective upon actuation of the relay 51, can be traced from ground, through wires 54 and 59, through the now shorted relay contacts 51a and 51b to a wire leading to the aircraft ignition magneto.

Operation of the relay 50 will, of course, open-circuit the connection from the negative terminal of the aircraft battery 49 to ground, whereby accidental shorting of damaged wiring to ground to cause sparking or heating of the wiring will be prevented.

The switch 48 and the head 43 of the adjustment knob 38 are mounted preferably so as to be controlled readily from the pilot's position in front of the instrument panel.

In order that the pilot can determine readily the elevation at which the emergency device is set to operate, a signal-light panel 61, located preferably on the instrument panel, is provided.

The signal light panel 61 comprises a plurality of lamps 62, each of which has one terminal grounded by being connected to the common ground wire 63. The other terminals of the lamps are connected individually by the wires 64, 65, 66, 67, 68 and 69 to a contact device comprising a plurality of piled contactors 70, 71, 72, 73, 74, 75 interspaced and insulated from each other by insulation pieces 76, and fixed against the underside of the panel 11 in abutting relation to the metallic disk 45 by a pair of machine screws 77 and a plate 78. Thus, as the adjustment screw 38 is turned outwardly, for increasing the elevation of operation of the emergency switch, the metallic disk 45 will make contact successively with the contactors 70, 71, 72, 73, 74, 75. The insulation pieces 76 are each thicker than disk 45 to prevent simultaneous contact of said disk with more than one of said contactors 70 to 75. These connections, through a circuit hereinbelow detailed, furnish energizing voltages to the individual lamps with which they are connected, which lamps are marked in elevations from 0 to 10,000 feet in 2000 foot increments, to corerspond with the elevation readings on the scale of bracket 46.

Connection to the metallic disk 45 is made through a spring brush 79 having one end fixed to the panel 11 and the other end pressing resiliently against the innermost end of the metallic adjusting screw 38. Thus, no matter to which position the adjusting screw 38 is set, electrical connection between the spring brush 79 and the metallic disk 45 will be complete. A wire 80 connects the spring brush 79 to wire 56, to complete the electrical circuit for the panel 61.

The energizing circuit for the panel lamps can be traced from the positive terminal of the battery 49, through wires 58 and 57, closed switch 48, wires 56 and 80 through the spring brush 79, adjusting screw 38, and the metallic disk 45 to the particular contactor with which it is in contact (0 elevation in the drawing), thence to the lamp associated therewith to energize it through its connection to ground.

Obviously many modifications and variations of the present invention are possible in the light of the above teachings. It is therefore to be understood that within the scope of the appended claims the invention can be practiced otherwise than as specifically described.

I claim:

1. In an electrical control of an electrical system embodying a source of electrical energy and a generator of electricity in proximity to an inflammable, a control circuit embodying a normally-open relay comprising a solenoid operable to short circuit and deenergize the generator, a normally-closed relay switch in the line of the electrical source and comprising a solenoid operable to open the line, a set of contacts operable to close the electrical-control circuit, and an instrument operable responsive to atmospheric pressure to actuate the contacts relative to each other into contacting engagement to close the control circuit at a predetermined atmospheric pressure, the several relay solenoids being connected in parallel in the control circuit and comprising respective electrical characteristics to operate the generator-control relay first to deenergize the generator and thereafter to operate the relay controlling the electrical energy source to open its line.

2. The electrical control as defined in claim 1 for control of the electrical system of an aircraft of which the magneto of the engine ignition constitutes the generator and the battery constitutes the source of electrical energy, the generator-control relay operating to short circuit the magneto to ground, and the relay controlling the electrical-energy source operating to open the battery line.

3. A pressure operated switch comprising a normally spaced pair of electrical contacts, means responsive to barometric pressure and adapted to move one of said contacts to a plurality of positions, said pair of contacts being in contact with each other at one of said positions, means for adjusting the position of the other of said contacts, an electrical circuit including said contacts, a voltage source in said circuit, a normally-closed electrical switch in series with said voltage source in said circuit, first solenoid means to open said normally-closed electrical switch upon energization thereof, said solenoid being energized through said normally-closed electrical switch, a normally-open electrical switch, second solenoid means to close said normally-open electrical switch upon energization thereof, the energizing windings of said first and second solenoid means being connected in parallel, said first soleoid means being faster-acting than said second solenoid means, whereby said normally-closed electrical switch is opened and said normally-open electrical switch is closed when said pressure-operated switch is brought to a predetermined height above sea level, a bank of lights, and means for selectively lighting one of said lights depending upon the position of said other contact, whereby there is an indication of said height at which said pressure-operated switch is set to operate.

4. A pressure-operated switch comprising a normally spaced pair of electrical contacts, means responsive to barometric pressure and adapted to move one of said contacts to a plurality of positions, said pair of contacts being in contact with each other at one of said positions, means for adjusting the spacing between said pair of contacts, an electrical circuit including said contacts, a voltage source in said circuit, a normally closed electrical switch in series with said voltage source in said circuit, first solenoid means to open said normally-closed electrical switch upon energization thereof, said solenoid being energized through said normally-closed electrical switch, a normally-open electrical switch, second solenoid means to close said normally-open electrical switch upon energization thereof, the energizing windings of said first and second solenoid means being connected in parallel, said first soleoid means being faster-acting than said second solenoid means, whereby said normally-closed electrical switch is opened and said normally-open electrical switch is closed when said pressure-operated switch is brought to a predetermined height above sea level, a plurality of visual indication means, and means for selectively operating one of said indication means whereby there is an indication of said height at which said pressure-operated switch is set to operate.

References Cited in the file of this patent

UNITED STATES PATENTS

| | | |
|---|---|---|
| 2,018,364 | Jensen | Oct. 22, 1935 |
| 2,089,988 | Webster et al. | Aug. 17, 1937 |
| 2,316,411 | Finnegan | Apr. 13, 1943 |
| 2,461,075 | Naylor | Feb. 8, 1949 |
| 2,468,945 | Sasser | May 3, 1949 |
| 2,489,997 | Anderson | Nov. 29, 1949 |